United States Patent
Zadgaonkar et al.

(10) Patent No.: US 10,665,252 B2
(45) Date of Patent: May 26, 2020

(54) SYSTEM AND METHOD FOR ESTIMATING PROPERTIES AND PHYSIOLOGICAL CONDITIONS OF ORGANS BY ANALYSING SPEECH SAMPLES

(71) Applicants: Ajit Arun Zadgaonkar, Riverside, CA (US); Arun Shrihari Zadgaonkar, Riverside, CA (US)

(72) Inventors: Ajit Arun Zadgaonkar, Riverside, CA (US); Arun Shrihari Zadgaonkar, Riverside, CA (US)

( * ) Notice: Subject to any disclaimer, the term of this patent is extended or adjusted under 35 U.S.C. 154(b) by 171 days.

(21) Appl. No.: 15/984,477

(22) Filed: May 21, 2018

(65) Prior Publication Data

US 2018/0336918 A1    Nov. 22, 2018

(30) Foreign Application Priority Data

May 22, 2017   (IN) .............................. 201721017974

(51) Int. Cl.
| | | |
|---|---|---|
| *G10L 25/66* | (2013.01) | |
| *G10L 15/04* | (2013.01) | |
| *G10L 15/02* | (2006.01) | |
| G10L 21/0208 | (2013.01) | |

(52) U.S. Cl.
CPC .............. *G10L 25/66* (2013.01); *G10L 15/02* (2013.01); *G10L 15/04* (2013.01); *G10L 21/0208* (2013.01); *G10L 2015/025* (2013.01)

(58) Field of Classification Search
CPC ..... G10L 25/66; G10L 15/02; G10L 21/0208; G10L 15/04

USPC .......................................................... 704/270
See application file for complete search history.

(56) References Cited

U.S. PATENT DOCUMENTS

| | | | | |
|---|---|---|---|---|
| 6,006,175 A * | 12/1999 | Holzrichter | .......... | A61B 5/0507 704/205 |
| 7,398,213 B1 * | 7/2008 | Levanon | ................. | G10L 17/26 704/261 |
| 7,925,508 B1 * | 4/2011 | Michaelis | ............ | A61B 5/4803 704/270 |
| 8,682,650 B2 * | 3/2014 | Gray | ....................... | G10L 25/69 379/1.02 |
| 2006/0271404 A1 * | 11/2006 | Brown | ................. | A61B 5/0002 705/2 |
| 2012/0209132 A1 * | 8/2012 | Jones | ..................... | A61B 7/026 600/528 |

* cited by examiner

*Primary Examiner* — Akwasi M Sarpong

(57) ABSTRACT

The present subject matter describes a system and method for estimating properties and physiological conditions of organs by analysing speech samples of the said user. The user device records the specifics of speech and uses these as a speech sample of the user's utterance. The user device transmits the speech samples and the metadata to the processor. The processor isolates phonation segments from the speech samples. The processor filters phonation segments. The processor isolates uttered speech segments from phonation segments. The processor performs acoustic-phonetic analysis of the uttered speech segments in order to determine speech markers and the corresponding dimensions of the organ(s). The International Phonetic alphabets (IPA) phonemes are used to derive speech markers that corresponds to specific organs and their dimensions. The system may generate a report based on organ dimensions, wherein the report is transmitted to the user.

8 Claims, 3 Drawing Sheets

SYSTEM AND METHOD FOR ESTIMATING PROPERTIES AND PHYSIOLOGICAL CONDITIONS OF ORGANS BY ANALYSING SPEECH SAMPLES

CROSS-REFERENCE TO RELATED APPLICATIONS AND PRIORITY

The present application claims priority from Indian provisional patent application no. 201721017974 filed on the 22 May 2017, the details of which are incorporated herein by a reference.

TECHNICAL FIELD

The present subject matter described herein, in general, relates to a system and method for estimating dimensions, properties and physiological conditions of organs by analysing speech samples of a user.

BACKGROUND

There are several critical organs which regulate the functioning of the human body. Having healthy organs of normal size (dimensions) is very important for human health. This is true for men, women, young & adults as well, as organ dimensions change according to various factors such as age, growth stages, life cycle and life style, diseases and illness. It has been well-established that abnormal organ sizes may lead to health problems. An underdeveloped or overgrown organ can be associated with many health issues such as fibrosis, tumors, pregnancy problems, fatigue, sleep disorders, infections, disorders, depression, premenstrual syndrome (PMS), cardiovascular disease, weight gain, autoimmune diseases, insomnia, and diabetes, whereas having balanced organ growth can help ensure good health. For example, ovaries may enlarge during different physiological conditions such as cyst formation that may occur during the second half of a menstruation cycle. However, enlarged ovaries over longer durations may be caused by a congenital abnormality, tumor or cancer and if it is not diagnosed and treated in time may lead to infertility and in some cases lead to loss of life. Similarly, an abnormal shape and dimensions of a uterus may lead to loss of pregnancy, while consistent expected growth during pregnancy may indicate normal physical growth of a foetus (fetus). In men, reduced testicular volume is usually associated with lower testicular functioning and lower sperm quality. Reduced kidney size may be caused by chronic kidney disease, repeated kidney infections, decreased blood supply to the kidneys and congenital conditions. Longer periods of abnormal tissue density, unexpected changes in breast volume when accompanied with pain in the breast may be a symptom of fibro cysts, tumors or breast cancer. Size of spleen is critical evaluation factor in determining health conditions. Measuring dimensions of pelvic region is an integral part of ensuring safe childbirth via vaginal delivery. Presently, organ examinations and measurement of their dimensions are conducted by advanced imaging technology (i.e. procedures such as an MRI, ultrasound, echocardiogram, and CT Scans). In the existing art, methods for determining organ dimensions rely on medical imaging techniques such as a sonography/ultrasound (high frequency sound waves), radiography (X-rays and other types of radiation), Magnetic Resonance Imaging (MRI), CT scan (Computerized Tomography), etc. Some of the existing methods adopted to determine the dimensions of human organs are described below:

The length, width, thickness, volume of an ovary and uterus have been measured using existing transvaginal ultrasound and MRI based methods. Further, the length, width, thickness, volume of a kidney, gallbladder, spleen is measured via sonography and MRI based methods. The dimensions of a foetus including length, width, thickness, volume, foetus dimensions (occipitofrontal length, bitemporal length, biparietal length of the skull) is determined via ultrasound and MRI based methods. Further, the ultrasound and the MRI based methods may be used to determine length, width, thickness, volume of a liver. Further, the length, width, thickness, volume of testes is measured using orchidometer (mechanical/manual measurement comparison to standard size chart using beads) and MRI based methods. Further an anatomic anthropometric (manual) measurement and application of geometric formulas or MRI is being utilized for measuring length, width, thickness, volume of breasts. Pancreatic ultrasound and MRI based methods enable in measuring length, width, thickness, volume of pancreas. Furthermore, pelvic ultrasound and MRI based methods are adopted to measure Michaelis lozenge—vertical and horizontal diagonals, Distantia Spinarum, Distantia Cristarum, Distantia Trochanterica and conjugata externa dimensions associated for pelvic region.

However, the aforementioned methods are expensive and require tests be administered by medically trained professionals and usually require patients to travel to clinics or hospitals or laboratory offices. At times tests are intrusive in nature especially transvaginal ultrasound and Transoesophageal Echocardiography (TEE). The tests are not comfortable for many, usually expensive, and impose a logistical burden on patients who might not be able to travel, and may require fasting, drinking water prior to the tests. Many people have to undergo frequent diagnostic and monitoring testing for infertility investigations, growth under pregnancy, cardiac health monitoring and treatments and the logistical burden that imposes on their daily lives. Further, in remote and under-developed parts of the world, health workers and medical resources are not easily accessible.

Thus, in view of the above, one can conclude that there is a long-felt need for easy, accurate, painless and non-invasive method(s) and system(s) for determining the dimensions, properties and physiological conditions of the organs which eliminates the burden of conducting numerous laboratory tests, enables determining organ dimensions and properties at any time, wherever the user might be without requiring a medically trained professional, complicated machinery, medical procedure or extraction of a physical bodily fluid.

SUMMARY

This summary is provided to introduce the concepts related to a system and method for estimating dimensions, properties and physiological conditions of organs by analysing speech samples and the concepts are further described in the detailed description. This summary is not intended to identify essential features of the claimed subject matter nor it is intended to use in determining or limiting the scope of claimed subject matter.

In one embodiment, a system for estimating dimensions, properties and physiological conditions of organs by analysing speech samples of a user disclosed. The system may comprise a processor and a memory coupled with the processor. The processor may be configured to execute a plurality of programmed instructions stored in the memory. The processor may execute a programmed instruction for interactively guiding a user to utter specifics of a speech via a user device communicatively coupled with the processor. Further, the processor may execute a programmed instruction for recording one or more speech samples associated with the user based upon the specifics of speech uttered by the user. The processor may further execute a programmed instruction for isolating one or more phonation segments from the one or more speech samples. Further, the processor may execute a programmed instruction for filtering one or more phonation segments to remove noise from the one or more phonation segments. The processor may further execute a programmed instruction for isolating one or more uttered speech segments from the one or more phonation segments filtered. Further, the processor may execute a programmed instruction for performing acoustic-phonetic analysis of the one or more uttered speech segments to extract one or more speech features. Furthermore, the processor may execute a programmed instruction in order to determine speech markers and the corresponding dimensions and properties of the organ(s) of the user. The acoustic-phonetic analysis may use a plurality of features associated with the user for analysis.

In accordance with aspects of the present disclosure, the specifics of speech may comprise attributes selected from a group comprising of a frequency and formants. Further, the specifics of speech may include, but not limited to, one or more of words, letters, phonations, and the like.

The International Phonetic alphabets (IPA) phonemes may be used to derive speech markers that corresponds to specific organs and their dimensions, wherein the IPA may include, but are not limited to, velar consonants, palatal consonants, retroflex consonants, dental consonants, labial consonants. The processor may generate report based on different properties and dimensions of the specific organs of the user in order to detect the physiological condition of the organs of the user, wherein the report generated may further be transmitted to the user device.

In another embodiment, a method for estimating dimensions, properties and physiological conditions of organs by analysing speech samples of a user is disclosed. The method may include interactively guiding, via a user device communicatively coupled with a processor, a user to utter specifics of a speech via a user. Further, the method may include recording, via the user device, one or more speech samples associated with the user based upon the specifics of speech uttered by the user. The method may further include isolating, via the processor, one or more phonation segments from the one or more speech samples. Further, the method may include filtering, via the processor, one or more phonation segments to remove noise from the one or more phonation segments. The method may further include isolating, via the processor, one or more uttered speech segments from the one or more phonation segments filtered. Further, the method may include performing, via the processor, acoustic-phonetic analysis of the one or more uttered speech segments to extract one or more speech features. Furthermore, the method may include determining, via the processor, one or more speech markers and the corresponding dimensions and properties of the organ(s) of the user. The acoustic-phonetic analysis may use a plurality of features associated with the user for analysis.

In accordance with aspects of the present disclosure, the specifics of speech may comprise attributes selected from a group comprising of a frequency and formants. Further, the specifics of speech may include, but not limited to, one or more of words, letters, phonations, and the like.

The International Phonetic alphabets (IPA) phonemes may be used to derive speech markers that corresponds to specific organs and their dimensions, wherein the IPA may include, but are not limited to, velar consonants, palatal consonants, retroflex consonants, dental consonants, labial consonants. The method may further include generating report based on different properties and dimensions of the specific organs of the user in order to detect the physiological condition of the organs of the user, wherein the report generated may further be transmitted to the user device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
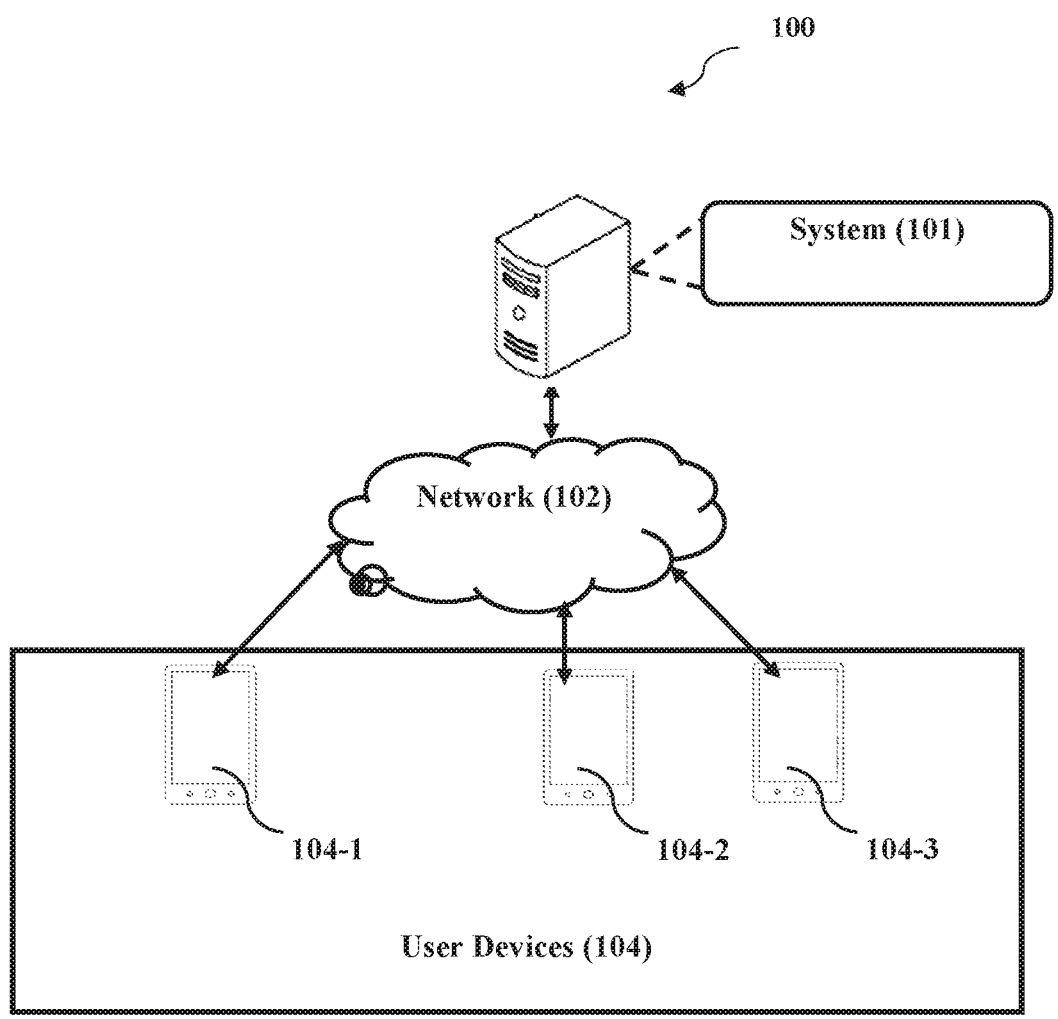
FIG. 1 illustrates a network implementation 100 of a system 101 for estimating dimensions, properties and physiological conditions of organs by analysing speech samples of a user, in accordance with an embodiment of a present subject matter.

FIG. 1 illustrates a network implementation 100 of a system 101 for estimating dimensions, properties and physiological conditions of organs by analysing speech samples of a user, in accordance with an embodiment of a present subject matter.

In an embodiment, the system 101 may be connected to a user device 104 over a network 102. It may be understood that the system 101 may be accessed by multiple users through one or more user devices 104-1, 104-2, 104-3 . . . 104-n, collectively referred to as user device 104 hereinafter, or applications residing on the user device 104. In an embodiment, as illustrated in FIG. 1, the system 101 may accept information provided by multiple users 104-1, 104-2, 104-3 using the user device 104 to register the respective user with the system 101.

In an embodiment, though the present subject matter is explained considering that the system 101 is implemented as a server, it may be understood that the system 101 may also be implemented in a variety of user devices, such as a but are not limited to, a portable computer, a personal digital assistant, a handheld device, a mobile, a laptop computer, a desktop computer, a notebook, a workstation, a mainframe computer, and the like. In some embodiments, the system 101 may be implemented in a cloud-based computing environment, a distributing computing environment, and the like.

In an embodiment, the network 102 may be a wireless network, a wired network or a combination thereof. The network 102 can be accessed by the device using wired or wireless network connectivity means including updated communications technology.

Figure 2:
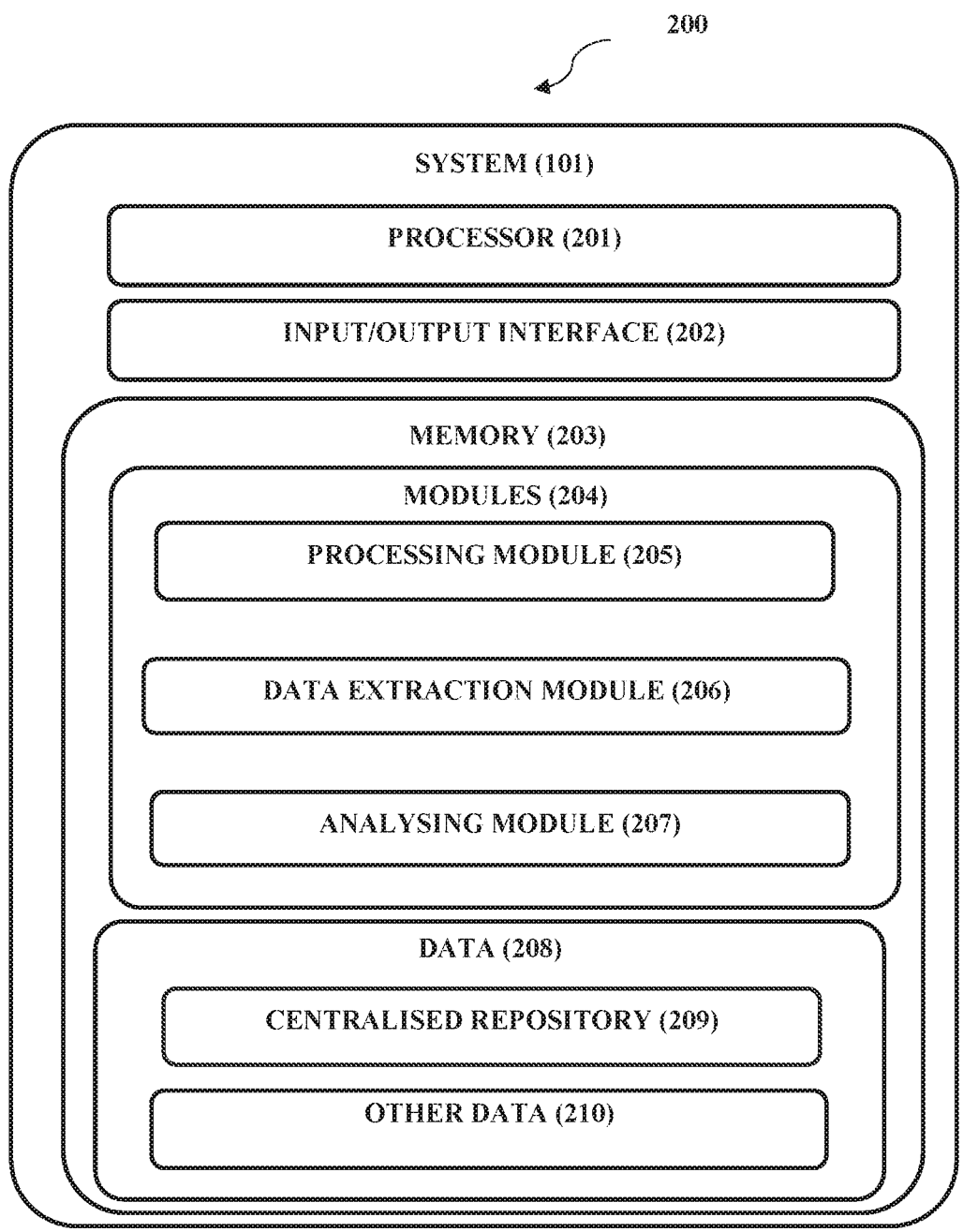
FIG. 2 illustrates a system 101 and its components, in accordance with an embodiment of a present subject matter.

Referring to FIG. 2, components of the system 101 are shown which may include at least one processor 201, an input/output (I/O) interface 202, a memory 203, modules 204 and data 208. In one embodiment, the at least one processor 201 is configured to fetch and execute computer-readable instructions stored in the memory 203.

In one embodiment, the I/O interface 202 may include a variety of software and hardware interfaces, for example, a web interface, a Graphical User Interface (GUI), and the like. The I/O interface 202 may allow the system to interact with the user device 104. Further, the I/O interface 202 may enable the system to communicate with other computing devices. The I/O interface 202 can facilitate multiple communications within a wide variety of networks and protocol types, including wired networks, for example, LAN, cable, etc., and wireless networks, such as WLAN, cellular, or satellite.

In one embodiment, the I/O interface 202 is an interaction platform that facilitates interaction between the user device 104 and the system 101. The I/O interface 202 may allow commands for a command line interface or the GUI which may enable a user to create, modify and delete either of data, metadata, program, logic, algorithm, parameters associated with encryption method, encryption program and encryption language.

In one embodiment, the memory 203 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 203 may include modules 204 and data 208.

In one embodiment, the modules 204 may include routines, programs, objects, components, data structure, etc., which performs particular tasks, functions or implement abstract data types. The modules 204 may further include a processing module 205, a data extraction module 206 and an analysing module 207. The data 208 may include a centralized repository 209 and other data 210.

In one embodiment, the user device 104 may interactively guide a user to utter specifics of speech. The user device 104 may record these specifics of speech using a sound recorder and may use these specifics of speech as a speech sample of user's utterance. The speech samples may be stored in a local storage of the user device 104. The user device 104 may further record one or more metadata of the user. The user device may transmit the speech samples and the metadata to a system 101 for further processing and analysis.

In one embodiment, the speech samples and the metadata may be stored within the centralized repository 209. In one embodiment, the specifics of speech may include, but not limited to, specific words, letters, phonation, etc. The metadata of the user may include, but are not limited to, user's name, age, location, etc.

In one embodiment, the processing module 205 may process the speech samples by isolating the one or more phonation segments from the speech samples. The processing module 205, may isolate phonation samples for isolating phonation sound using existing phonation isolation techniques/algorithms known in the art. The processing module 205 may further filter the one or more phonation segments in order to remove noise from the one or more phonation segments using existing phonation segment filtration techniques/algorithms known in the art. The processing module 205 may further isolate the uttered speech segments from the one or more phonation segments.

In one embodiment, the data extraction module 206 may extract the speech features from the uttered speech segments using existing speech feature extraction techniques/algorithms known in the art. The speech features may include, but are not limited to, utterance of the user, vowel and consonants under isolated and/or Vowel Consonant (VC), Consonant Vowel (CV) environment, formants of the utterance, pitch of the utterance, vocal intensity of the utterance, speech quality of the utterance, Vowel Onset Point (VOP), energy transition, values of dispersion and bandwidth, Voice Onset Time (VOT), start and stop occlusion points, voicing onset and offset points, articulatory rate, shimmer, jitter, spectrogram, spectral flatness, power, zero crossing rate, etc. The speech features may form a unique set of properties that belong to the user. The unique set of properties that corresponds to the user's current physiological condition may be referred herein as speech markers. The speech markers associated with specific organs may be used to determine the dimensions and properties of a particular organ of the user.

In one embodiment, the speech may have two types of attributes including, frequency and formants. The user's vocal tract is a tube or concatenation of tubes of varying cross-sectional area that is excited either at one end or at a point along the tube. The transfer function of energy from the excitation source to the output can be described in terms of the natural frequency or resonances of the tube. Such resonances are called formants for speech. The formants for speech may represent the frequencies that pass the most acoustic energy from the source of the output. Fant Gunnar, in a publication "Acoustic Theory of Speech Production" Mouton & Co, The Hague, Netherlands, 1960 (hereinafter "Reference 1") defines formants as the spectral peaks of a sound spectrum |P(f)| of the voice. Further, Fant Gunnar., in publication "Acoustic Theory of Speech Production" (1990) (hereinafter "Reference 2") and the Rabiner, L. et. al., in another publication "Digital Processing of Speech Signals", Prentice-Hall., (1978) (hereinafter "Reference 3") collectively proposes that in speech science and phonetics, formant is also used to mean an acoustic resonance of the human vocal tract. Further, according to the Reference 3, the formant is often measured as an amplitude peak in the frequency spectrum of the sound, using a spectrogram. Furthermore, Meurer, Elisea et. al., in a publication "Menstrual Cycle Influences on Voice and Speech in Adolescent Females" (hereinafter "Reference 4") describes that the human vocal tract exhibits four or more major resonances, collectively known as "formants".

Further, the Reference 1, describes that it has been described that users/speakers carry the anatomical makeup for speech movement and motor capability to achieve the complex movement as per the speech pattern. Furthermore, according to the Reference 1, a general rule in acoustic-articulatory relationship is that F1 frequency varies inversely with tongue height and F2 frequency or the difference between F2 and F1, varies inversely with tongue advancement. F2 variation is known to correspond to the front/back position of the tongue in articulatory terms.

Dr. Will Styler et. al., in a publication "Using Praat for Linguistic Research" document version 1.7 defines VOT as a time between when the stop is released and when the voicing of the following vowel begins. Measuring this time, which can be positive (say, for the English voiceless aspirated stop ta), around zero (for the English "voiced" stop /d/, or, more commonly, the voiceless unaspirated [ta] around the world), or negative (for fully voiced stops, where voicing starts before the stop is released, as found in most non-English languages). Many languages classify their stops largely based on VOT, and it's often an excellent, more gradient empirical measure of the "voiced/voiceless" phonological distinction.

In one embodiment, VOP is the point in time at which the start of the vowel component of the utterance takes place in the speech signal.

In one embodiment, the analysing module 207 may perform an acoustic-phonetic analysis using the extracted speech features of the uttered speech segments in order to determine speech markers and the corresponding organ dimensions of the user. The analysing module 207 may use IPA phonemes in order to derive the speech markers that corresponds to specific organs and their dimensions. The IPA phonemes may include, but are not limited to, velar consonants, palatal consonants, retroflex consonants, dental consonants, labial consonants.

In one embodiment, a certain set of speech markers associated with the specific organs may be used to determine the dimension of the particular organ in the user with mathematical calculations. Thus, by selecting the speech markers associated with the organ and by applying the mathematical relationship between the speech markers and the organs, the organ dimensions of the user may be determined.

In one embodiment, the dimensions of ovary, uterus, kidney, foetus, testicles and breasts may be determined by using the following steps:
Palatal consonants, retroflex consonants, dental consonants and labial consonants may be selected.
The speech characteristics such as pitch, formants, VOP, VOT, intensity and time duration may be extracted.
Organ-specific algorithm may be applied which may include a value which may be computed statistically, or may be derived by artificial intelligence, of the speech characteristic derived from speech markers are used to determine dimensions such as length, width, thickness, volume. It may also be applied to determine dimensions related to foetus such as occipitofrontal length, bitemporal length and biparietal length.

In one embodiment, the dimensions of liver, gallbladder, pelvic, spleen and pancreas may be determined by using the following steps:
Retroflex consonants, dental consonants and labial consonants may be selected.
Speech characteristics such as pitch, formants, VOP, VOT, intensity and time duration may be extracted.
Organ-specific algorithm may be applied which may include a value which may be computed statistically, or may be derived by artificial intelligence, of the speech characteristic to determine dimensions such as length, width, thickness, volume. It may also be applied to determine dimensions related to foetus such as occipitofrontal length, bitemporal length and biparietal length.

In one embodiment, the report may be generated based on the dimensions of different organs. The report may be further transmitted to the user of the user device 104 via the network 102.

Figure 3:
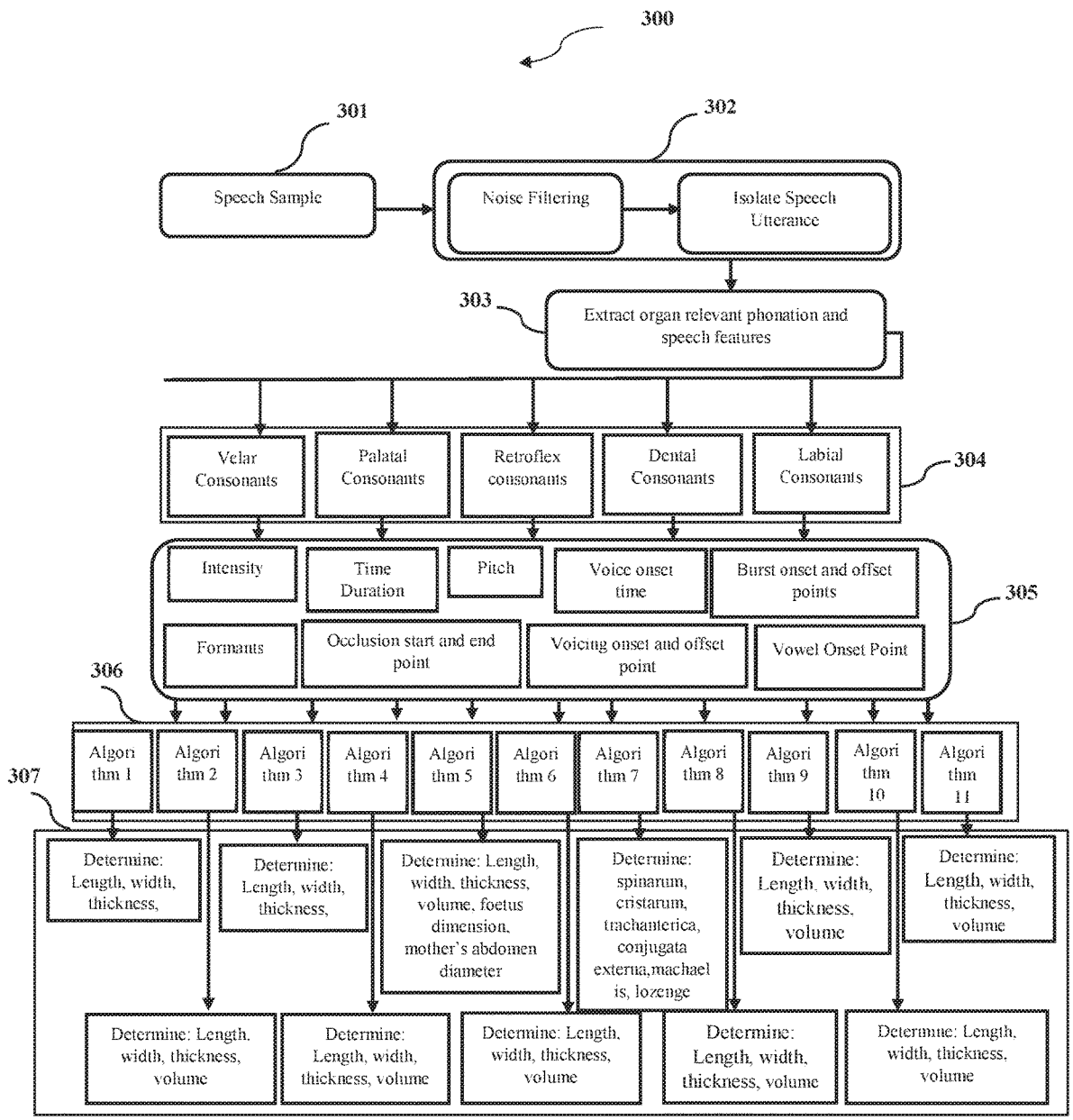
FIG. 3 illustrates a flow diagram depicting a method for estimating dimensions, properties and physiological conditions of organs by analysing speech samples of a user, in accordance with an embodiment of a present subject matter.

FIG. 3 illustrates a flow diagram depicting a method for estimating dimensions, properties and physiological conditions of organs of a user by analysing speech samples of the said user, in accordance with an embodiment of a present subject matter.

At block 301, the user device 104 may record the speech samples by guiding a user to utter specifics of speech. The speech samples may be stored in the local storage of the user device 104. The user device 104 may further record one or more metadata of the user. The user device may transmit the speech samples and the metadata to a system 101 for further processing and analysis.

At block 302, the speech samples may be processed by the processing module 205. The processing module 205 may process the speech samples by isolating the one or more phonation segments from the speech samples. The processing module 205 may further filter the one or more phonation segments in order to remove noise from the one or more phonation segments. The processing module 205 may further isolate the uttered speech segments from the one or more phonation segments.

At block 303, the organ relevant phonation and speech features may be extracted from the uttered speech segments by the data extraction module 206.

At blocks 304, the analysing module 207 may perform the acoustic-phonetic analysis using the extracted speech features of the uttered speech segments in order to determine speech markers and the corresponding organ dimensions of the user. In one embodiment, the analysing module 207 may use IPA phonemes in order to derive the speech markers that corresponds to specific organs and their dimensions.

At block 305, the analysing module 207 may further use the speech features for determining speech markers and the corresponding organ dimensions of the user.

At block 306, the analysing module 207 may execute different algorithms which may comprise mathematical formula and/or artificial intelligence to determine dimensions of different organs.

In one embodiment, following different algorithms (indicated in FIG. 3) which may comprise mathematical formula and/or artificial intelligence, may be applied to derive speech markers for different organs.
Algorithm 1 represents an algorithm applied to derive speech markers for ovary.
Algorithm 2 represents an algorithm applied to derive speech markers for testicles.
Algorithm 3 represents an algorithm applied to derive speech markers for uterus.
Algorithm 4 represents an algorithm applied to derive speech markers for kidney.
Algorithm 5 represents an algorithm applied to derive speech markers for foetus.
Algorithm 6 represents an algorithm applied to derive speech markers for breasts.
Algorithm 7 represents an algorithm applied to derive speech markers for pelvic.
Algorithm 8 represents an algorithm applied to derive speech markers for spleen.
Algorithm 9 represents an algorithm applied to derive speech markers for liver.
Algorithm 10 represents an algorithm applied to derive speech markers for pancreas.
Algorithm 11 represents an algorithm applied to derive speech markers for gallbladder.

At block 307, different dimensions may be determined for different organs.
For the organs including ovary, testicles, uterus, kidney, breasts, spleen, liver, pancreas and gallbladder, the dimensions including length, width, thickness and volume may be determined.
For foetus, the dimensions including length, width, thickness, volume, foetus dimensions and mother's abdomen diameter may be determined
For pelvic, the dimensions including spinarum, cristarum, trachanterica, conjugata externa, machaelis and lozenge may be determined.

In one embodiment, the report may be generated based on the dimensions of different organs. The report may be further transmitted to the user of the user device 104 via the network 102.

EXEMPLARY EMBODIMENTS OF THE PRESENT DISCLOSURE

Exemplary Embodiment 1 (Determining Dimensions of Liver)

In this exemplary embodiment, a combination of dental, retroflex and labial phonation may be used to calculate the dimensions of liver. Phonation is separated using software known in the prior art. Then the noise from the phonation is filtered out and speech features are extracted. From the extracted features, for the duration of phonation utterance up to VOP point, the average value of Pitch, and from Formant listing, dimensions are estimated as mentioned below in table 1.

TABLE 1

| Phonation | Average Pitch (P) (Hz) | Average Formant (Fx) | (x) = 8507/(Fx) | Sx = Sum of X values | Xavg = average of X values |
|---|---|---|---|---|---|
| Retroflex | 221.4033333 | 634.34 | 13.41078917 | 44.44937496 | 14.81645832 |
| Dental | | 592.93 | 14.34739345 | | |
| Labial | | 509.67 | 16.69119234 | | |

From the above values, the dimensions of Liver are computed as below:

Length $(L)=P*0.075=16.60525$ cm

Width $(W)=Sx*0.1666667=7.40822916$ cm

Thickness $(T)=Xavg*0.3333333=4.93881944$ cm

Exemplary Embodiment 2 (Determining Dimensions of Gallbladder)

In this exemplary embodiment, a combination of dental, retroflex and labial phonation may be used to calculate the dimensions of Gallbladder. Phonation is separated using software known in the prior art. Then the noise from the phonation is filtered out and speech features are extracted. From the extracted features, for the duration of phonation utterance up to VOP point, the average value of Pitch, and from Formant listing, dimensions are estimated as mentioned below in table 2.

TABLE 2

| Phonation | Average Pitch (P) (Hz) | Average Formant (Fx) | (x) = 8507/(Fx) | Sx = Sum of X values | Xavg = average X values |
|---|---|---|---|---|---|
| Retroflex | 245.03 | 682.89 | 12.45735038 | 40.79645885 | 13.59881962 |
| Dental | | 656.31 | 12.96186253 | | |
| Labial | | 553.22 | 15.37724594 | | |

From the above values, the dimensions of Gallbladder are computed as below:

Length $(L)=P*0.0375=9.188625$ cm

Width $(W)=Sx*0.1666667=6.799409809$ cm

Volume$=L*W2*0.25=106.2020675$ cm$^3$

Exemplary Embodiment 3 (Determining Dimensions of Spleen)

In this exemplary embodiment, another combination of dental, retroflex and labial phonation may be used to calculate the dimensions of spleen. Phonation is separated using software known in the prior art. Then the noise from the phonation is filtered out and speech features are extracted. From the extracted features, for the duration of phonation utterance up to VOP point, the average value of Pitch, and from Formant listing, dimensions are estimated as mentioned below in table 3.

TABLE 3

| Phonation | Average Pitch (P) (Hz) | Average Formant (Fx) | (x) = 8507/(Fx) | Sx = Sum of X values | Xavg = average X values |
|---|---|---|---|---|---|
| Retroflex | 220.4566667 | 400.41 | 21.24572313 | 66.69497192 | 22.23165731 |
| Dental | | 370.85 | 22.93919374 | | |
| Labial | | 377.92 | 22.51005504 | | |

From the above values, the dimensions of Spleen are computed as below:

Length $(L) = P*0.0375 = 8.267125$ cm

Width $(W) = Sx*0.1666667*0.5 = 5.557914326$ cm

Thickness $(T) = Xavg*0.3333333*0.5 = 3.705276218$ cm

Volume $= L*W*T = 106.406206$ cm$^3$

Exemplary Embodiment 4 (Determining Dimensions of Pancreas)

In this exemplary embodiment, a different combination of dental, retroflex and labial phonation may be used to calculate the dimensions of Pancreas. Phonation is separated using software known in the prior art. Then the noise from phonation is filtered out and speech features are extracted. From the extracted features, for the duration of phonation utterance up to VOP point, the average value of Pitch, and from Formant listing, dimensions are estimated as mentioned below in table 4.

TABLE 4

| Phonation | Average Pitch (P) (Hz) | Average Formant (Fx) | (x) = 8507/(Fx) | Sx = Sum of X values | Xavg = average X values |
|---|---|---|---|---|---|
| Retroflex | 228.6033333 | 400.41 | 21.24572313 | 55.02233252 | 18.34077751 |
| Dental | | 497.91 | 17.08541704 | | |
| Labial | | 509.67 | 16.69119234 | | |

From the above values, the dimensions of Pancreas are computed as below:

Length $(L) = P*0.075 = 17.14525$ cm

Width $(W) = Sx*0.1666667 = 9.170388753$ cm

Thickness $(T) = Xavg*0.3333333 = 6.113592502$ cm

Volume $= L*W*T*0.0625 = 60.07697734$ cm$^3$

Exemplary Embodiment 5 (Determining Dimensions of Pelvic)

In this exemplary embodiment, a different combination of dental, retroflex and labial phonation may be used to calculate the dimensions of Pelvic. Phonation is separated using software known in the prior art. Then the noise from the phonation is filtered out and speech features are extracted. From the extracted features, for the duration of phonation utterance up to VOP point, the average value of Formant listing, dimensions are estimated as mentioned below in table 5.

TABLE 5

| Phonation | Average Formant (Fx) | (x) = 8507/(Fx) |
|---|---|---|
| Dental | 343.19 | 24.7880183 |
| Labial | 326.65 | 26.04316547 |

From the above values, Michaelis lozenge diagonals of Pelvic are computed as below:

Vertical Diagonal $= X$ of Labial$*0.5 = 13.02158273$ cm

Horizontal diagonal $= X$ of Dental$*0.5 = 12.39400915$ cm

Exemplary Embodiment 6 (Determining Dimensions of Ovary)

In this exemplary embodiment, a combination of dental, retroflex and labial phonation may be used to calculate the dimensions of the ovary. Phonation is separated using software known in the prior art. Then the noise from the phonation is filtered out and speech features are extracted. From the extracted features, for the duration of phonation utterance up to VOP point, the average value of Pitch, and from Formant listing, dimensions are estimated as mentioned below in table 6.

TABLE 6

| Phonation | Average Pitch (P) (Hz) | Average Formant (Fx) | (x) = 8507/(Fx) | Sx = Sum of X values of Dental and Labial | Xavg = average X values |
|---|---|---|---|---|---|
| Retroflex | 225.14 | 634.34 | 13.41078917 | 35.48383648 | 22.52197395 |
| Dental | | 656.31 | 12.96186253 | | |
| Labial | | 377.72 | 22.52197395 | | |

From the above values, the dimensions of the Ovary are computed as below:

Length $(L)=P*0.03=6.7542$ cm

Width $(W)=Sx*0.0714285=2.534559749$ cm

Thickness $(T)$=Max value of $X*0.1111111=2.50244155$ cm

Volume=$(L*W*T)/2=21.41955267$ cm$^3$

Exemplary Embodiment 7 (Determining Dimensions of Uterus)

In this exemplary embodiment, a combination of dental, retroflex and labial phonation may be used to calculate the dimensions of Uterus. Phonation is separated using software known in the prior art. Then the noise from the phonation is filtered out and speech features are extracted. From the extracted features, for the duration of phonation utterance up to VOP point, the average value of Pitch, and from Formant listing, dimensions are estimated as mentioned below in table 7.

TABLE 7

| Phonation | Average Pitch (P) (Hz) | Average Formant (Fx) | (x) = 8507/(Fx) | Sx = Sum of X values of Dental and Labial | Xavg = average X values |
|---|---|---|---|---|---|
| Retroflex | 212.7033333 | 537.53 | 15.82609343 | 61.90982855 | 24.7880183 |
| Dental | | 343.19 | 24.7880183 | | |
| Labial | | 399.47 | 21.29571682 | | |

From the above values, the dimensions of Uterus are computed as below:

Length $(L)=P*0.03=6.3811$ cm

Width $(W)=Sx*0.0714285=4.422130611$ cm

Thickness $(T)$=Max value of $X*0.1111111=2.754224255$ cm

Volume=$(L*W*T)*3=155.4377176$ cm$^3$

Exemplary Embodiment 8 (Determining Dimensions of Kidney)

In this exemplary embodiment, phonation may be used to calculate the dimensions of Kidney. Firstly, Phonation is separated using software known in the prior art. Then the noise from phonation is filtered out and speech features are extracted. From the extracted features, for the duration of phonation utterance up to VOP point, the average value of Pitch, and from Formant listing, dimensions are estimated as mentioned below in table 8

TABLE 8

| Phonation | Average Pitch (P) (Hz) | Average Formant (Fx) | (x)= 8507/(Fx) | Sx = Sum of X values of Dental and Labial | Xavg = average X values |
|---|---|---|---|---|---|
| Retroflex | 213.5 | 785.65 | 10.82797683 | 61.90982855 | 10.82797683 |

From the above values, the dimensions of Kidney are computed as below:

Length $(L)=P*0.05=10.675$ cm

Width $(W)=Fx*0.01=7.8565$ cm

Thickness $(T)=X*0.1=1.082797683$ cm

Volume=$(L*W*T)/3=90.812225$ cm$^3$

Exemplary Embodiment 9 (Determining Dimensions of Testicles)

In this exemplary embodiment, a combination of dental, retroflex and labial phonation may be used to calculate the dimensions of Testicles. Phonation is separated using software known in the prior art. Then the noise from the phonation is filtered out and speech features are extracted. From the extracted features, for the duration of phonation utterance up to VOP point, the average value of Pitch, and from formant listing, dimensions are estimated as mentioned below in table 9.

TABLE 9

| Phonation | Average Pitch (P) (Hz) | Average Formant (Fx) | (x) = 8507/(Fx) | Sx = Sum of X values of Dental and Labial | Xavg = average X values |
|---|---|---|---|---|---|
| Retroflex | 166.0566667 | 586.35 | 14.50839942 | 43.03294724 | 29.01234568 |
| Dental | | 606.75 | 14.02060157 | | |
| Labial | | 293.22 | 29.01234568 | | |

From the above values, the dimensions of the Testicles are computed as below:

Length $(L)=P*0.03=4.9817$ cm

Width $(W)=Sx*0.0714285=3.073781946$ cm

Thickness $(T)$=Max value of $X*0.1111111=3.223593964$ cm

Volume=$(L*W*T)/3=16.45393227$ cm$^3$

Exemplary Embodiment 10 (Determining Dimensions of Breasts)

In this exemplary embodiment, a combination of dental, retroflex and labial phonation may be used to calculate the dimensions of Breasts. Phonation is separated using software known in the prior art. Then the noise from phonation is filtered out and speech features are extracted. From the extracted features, for the duration of phonation utterance up to VOP point, the average value of Pitch, and from Formant listing, dimensions are estimated as mentioned below in table 10.

TABLE 10

| Phonation | Average Pitch (P) (Hz) | Average Formant (Fx) | (x) = 8507/(Fx) | Sx = Sum of X values of Dental and Labial | Xavg = average X values |
|---|---|---|---|---|---|
| Retroflex | 222.8 | 682.89 | 12.45735038 | 44.23491057 | 22.93919374 |
| Dental | | 370.85 | 22.93919374 | | |
| Labial | | 399.47 | 21.29571682 | | |

From the above values, the dimensions of Breast are computed as below:

Length $(L)=P*0.03=6.684$ cm

Width $(W)=Sx*0.0714285=3.159636469$ cm

Thickness $(T)$=Max value of $X*0.1111111=2.548799305$ cm

Volume=Fx of Retroflex*Fx of dental*Fx of Labial*0.00001=1011.65680.2 cm$^3$

Exemplary Embodiment 11 (Determining Dimensions of Fetus)

In this exemplary embodiment, a combination of dental, retroflex and labial phonation may be used to calculate the dimensions of Fetus. Phonation is separated using software known in the prior art. Then the noise from the phonation is filtered out and speech features are extracted.

From the extracted features, for the duration of phonation utterance up to VOP point, the average value of Pitch, and from Formant listing, dimensions are estimated as mentioned in table 11 below.

TABLE 11

| Phonation | Average Pitch (P) (Hz) | Average Formant (Fx) | (x) = 8507/(Fx) | Sx = Sum of X values of Dental and Labial | Xavg = average X values |
|---|---|---|---|---|---|
| Retroflex | 221.47 | 359.46 | 23.66605464 | 63.9581398 | 27.20237905 |
| Dental | | 312.73 | 27.20237905 | | |
| Labial | | 649.9 | 13.08970611 | | |

From the above values, the dimensions of Fetus are computed as below:

Length $(L)=(P*0.27)-1=58.7969$ cm

Width $(W)=Sx*0.4285714=27.41063134$ cm

Thickness $(T)$=Max value of $X*0.740740=20.14991041$ cm

Volume $(V)=L*W*T*0.2=6494.961525$ cm$^3$

Weight in grams $(Wt)=V*0.2=1298.992305$ grams

Occipital frontal Length of fetus=$P*0.051=11.29497$ cm

Bi temporal Length of fetus=$T*0.2666666667=5.695$ cm

Bi Parietal Length of fetus=$W*0.2666666667=7.752$ cm

Exemplary Embodiment 12 (Determining Fetus Heart Rate)

In this exemplary embodiment, a combination of dental, retroflex and labial phonation may be used to calculate the dimensions of Fetus. Phonation is separated using software known in the prior art. Then the noise from phonation is filtered out and speech features are extracted. From the extracted features, for the duration of phonation utterance up to VOP point, the average value of Pitch, and from Formant listing, dimensions are estimated as mentioned below in table 12.

TABLE 12

| Phonation | Average Pitch (P) (Hz) | Average Formant (Fx) | (x) = 8507/(Fx) | Sx = Sum of X values of Labial |
|---|---|---|---|---|
| Labial | 218.02 | 649.9 | 39.0193560 | 13.08970611 |

From the above values, Fetal Heart Rate (FHR) is computed as below:

Fetal Heart Rate (FHR)=$Sx-X+120=145.9296499$ Beats per minutes

Although implementations for a system and method for estimating properties and physiological conditions of organs by analysing speech samples of said user have been described in language specific to structural features and/or methods, it is to be understood that the appended claims are not necessarily limited to the specific features or methods described. Rather, the specific features and methods are disclosed as examples of implementations for estimating properties and physiological conditions of organs by analysing speech samples of said user.

What is claimed is:

1. A system (101) for estimating dimensions, properties and physiological conditions of organs by analysing speech samples of a user, the system comprising:
    a processor (201); and
    a memory (203) coupled with the processor, wherein the processor is configured to execute a plurality of programmed instructions stored in the memory (203), the plurality of programmed instructions comprising instructions for:
        interactively guiding a user to utter specifics of speech via a user device (104) communicatively coupled with the processor (201);
        recording, via the user device, one or more speech samples associated with the user based upon the specifics of speech uttered by the user, wherein the specifics of speech comprises one or more of words, letters, and phonations;
        isolating one or more phonation segments from the one or more speech samples;
        filtering one or more phonation segments to remove noise from the one or more phonation segments;
        isolating one or more uttered speech segments from the one or more phonation segments filtered;
        performing acoustic-phonetic analysis of the one or more uttered speech segments to extract one or more speech features;
        determining one or more speech markers, corresponding dimensions and properties of organs of the user based upon the one or more speech features; and
        generating reports based on different properties and dimensions of the specific organs of the user in order to detect the physiological condition of the organs of the user.

2. The system according to claim 1, wherein the specifics of speech comprises attributes selected from one or more frequencies, one or more formants, one or more intensities, or combinations thereof.

3. The system according to claim 1, wherein the one or more speech features comprises utterance of the user, vowel and consonants under isolated and/or Vowel Consonant (VC), Consonant Vowel (CV) environment, formants of the utterance, pitch of the utterance, vocal intensity of the utterance, speech quality of the utterance, Vowel Onset Point (VOP), energy transition, values of dispersion and bandwidth, Voice Onset Time (VOT), start and stop occlusion points, voicing onset and offset points, articulatory rate, shimmer, jitter, spectrogram, spectral flatness, power, and zero crossing rate.

4. The system according to claim 1, wherein the one or more speech markers for determining the dimensions, properties and physiological conditions of organs including ovary, uterus, kidney, foetus, testicles, breasts, liver, gallbladder, spleen and pancreas are determined using speech characteristics of International Phonetic alphabets (IPA) phonemes selected from a group comprising velar consonants, palatal consonants, retroflex consonants, dental consonants, and labial consonants consonant.

5. The system according to claim 4, wherein the speech characteristics derived from the one or more speech markers are used to determine dimensions including length, width, thickness, and volume of organs.

6. The system according to claim 4, wherein one or more specific speech markers for determining dimensions, properties, and physiological conditions of the organs including ovary, uterus, kidney, foetus, testicles, and breasts are derived from Palatal consonants, retroflex consonants, dental consonants, and labial consonants.

7. The system according to claim 4, wherein one or more specific speech markers for determining dimensions, properties, and physiological conditions of the organs including liver, gallbladder, spleen, and pancreas are derived from Retroflex consonants, dental consonants, and labial consonants.

8. A method for estimating dimensions, properties, and physiological conditions of organs by analysing speech samples of a user, the method comprising:

interactively guiding, via a user device communicatively coupled with a processor, a user to utter specifics of speech;

recording, via the user device, one or more speech samples associated with the user based upon the specifics of speech uttered by the user, wherein the specifics of speech comprises one or more of words, letters, and phonations;

isolating, via the processor, one or more phonation segments from the one or more speech samples;

filtering, via the processor, one or more phonation segments to remove noise from the one or more phonation segments;

isolating, via the processor, one or more uttered speech segments from the one or more phonation segments filtered;

performing, via the processor, acoustic-phonetic analysis of the one or more uttered speech segments to extract one or more speech features;

determining, via the processor, one or more speech markers, corresponding dimensions, properties, and physiological conditions of organs by analysing speech samples a user based upon the one or more speech features; and generating, via the processor, reports based on different properties and dimensions of the specific organs of the user in order to detect the physiological condition of the organs of the user.

* * * * *